June 16, 1964 R. S. WOOLDRIDGE, JR 3,137,453

TAPE LOOP CONTROL

Filed Nov. 9, 1961 3 Sheets-Sheet 1

INVENTOR
ROBERT S. WOOLDRIDGE JR.

BY William G. Miller Jr.
AGENT

June 16, 1964 R. S. WOOLDRIDGE, JR 3,137,453

TAPE LOOP CONTROL

Filed Nov. 9, 1961 3 Sheets-Sheet 2

BALANCE POINT CONTROL AMPLIFIER

United States Patent Office 3,137,453

Patented June 16, 1964

3,137,453

TAPE LOOP CONTROL

Robert S. Wooldridge, Jr., Norristown, Pa., assignor to Sperry Rand Corporation, New York, N.Y., a corporation of Delaware Filed Nov. 9, 1961, Ser. No. 151,375
6 Claims. (Cl. 242—55.12)

This invention concerns a control system for a tape transport in which a capstan rapidly moves a length of tape from a supply reel past a fixed point to a take-up reel. More specifically, this invention concerns a control system for controlling the reel drive motors to maintain optimum lengths for buffer loops of tape between the supply reel and the capstan and between the take-up reel and the capstan as may be needed to accommodate the rapid acceleration and deceleration of the tape by the capstan to a less rapid acceleration and deceleration of the reels. This invention is particularly directed to a control which energizes the reel motors by an amount which is a direct function of the deviation of the corresponding buffer loop lengths from their optimum values.

Reel motor drive control has in the past been effected in response to deviation of the length of the buffer tape loop from a desired value. In such systems, however, the lengths of the tape loops have been detected by photoelectric means, by self-synchronous generators, or by vacuum transducers of various types. These arrangements have, therefore, been either expensive or unreliable. It is thus a primary object of this invention to provide an improved control system which is both reliable and relatively inexpensive.

Another object of this invention is the provision of a loop length detector which utilizes the vacuum loop box itself as an element of the transducer.

It is still another object of this invention to provide a proportional control of the reel motors by utilizing inexpensive vacuum switches to serve in conjunction with a vacuum loop box as a loop length detecting elements.

Still another object of this invention is the provision of an inexpensive proportional control system for reel motors in tape transport systems utilizing vacuum loop boxes for storing buffer lengths of tape between each reel and the capstan.

In carrying out the objects of this invention there is provided a plurality of vacuum switches for detecting the lengths of the loops in each of the vacuum loop boxes. These switches are connected to different points along the lengths of each of the vacuum loop boxes so that they respond to the pressures at these different points. Signal producing means are provided to be operable in response to the selective actuation of the switches by the vacuum established below each of the loops thereby to produce a signal associated with each of said vacuum loop boxes which signal is indicative of the length of the tape in that loop box. Control means are provided which are operable in response to the deviation of this signal representing actual loop length from a predetermined relationship with a signal representing the desired loop length for each box to energize the motors driving the reels associated with each of the loop boxes individually in direction and amount to substantially eliminate said deviation.

The foregoing objects, advantages, construction and operation of the invention will become more readily apparent from the following description in conjunction with the drawings in which like reference numerals identify like elements and in which:

FIGURE 1*a* is a diagram showing a portion of the control circuits for the capstan and the reels and the arrangement of the tape transport;

FIGURE 1*b* is a side view of one of the loop boxes;

FIGURE 1*c* is a schematic diagram of the circuit of one of the vacuum switches;

Figures 1A, 1B, 1C:
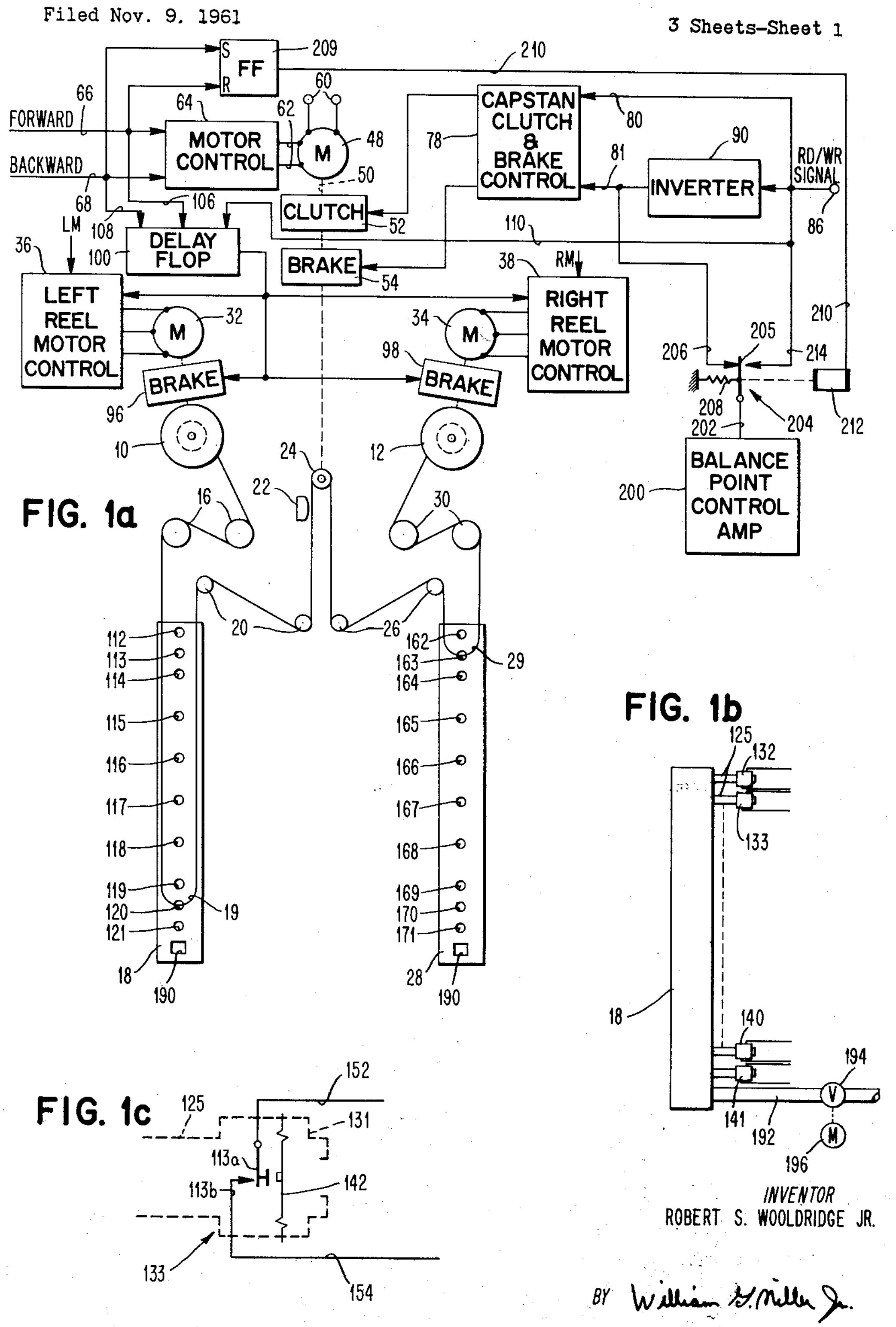

With reference to FIGURE 1*a* the invention is described for a tape transport system utilizing a supply reel 10 and a take-up reel 12. The tape 14 which in the present embodiment may be magnetic tape of the type generally used in storing digital information, follows a path leading from supply reel 10 over idler pulleys 16 into vacuum loop box 18 to form loop 19 and thence over idler pulleys 20 past the magnetic head 22, over capstan 24, over idler pulleys 26 into vacuum loop box 28 to form loop 29 and thence over idler pulleys 30 to take-up reel 12.

The reels 10 and 12 are driven by reversible motors 32 and 34, respectively. Each of the motors 32 and 34 is controlled by a single motor control circuit, shown in FIGURE 1*a* as blocks 36 and 38, respectively. The motor control is shown in block diagram form in view of the fact that those skilled in the art are cognizant of numerous control circuits which may be utilized for controlling the direction of rotation and the torque of such motors. The left reel motor control is shown as being operated in response to an input signal LM to the block 36 corresponding with the signal LM in FIGURE 2. Likewise, the right reel motor control 38 is under the control of an input signal RM corresponding to signal RM of FIGURE 2.

The capstan 24 in this embodiment is the primary means for moving tape across the magnetic head 22 during a writing of digital data on the tape or a reading of such data from the tape. The capstan 24 is rotated by reversible motor 48 by way of a mechanical connection 50 and under the control of the interposed clutch mechanism 52 and brake mechanism 54. The motor 48 is connected to one phase of a suitable A.C. power source at terminals 60 while terminal 62 is selectively connected to an A.C. source which is of one phase or another in dependence upon the operation of the motor reversing control 64 in response to a forward or reverse signal, respectively. These signals are in the form of a single pulse from lines 66 or 68 and are indicative of a command, for the capstan to move tape in a forward or backward direction, respectively. The forward direction is from supply reel 10 to take-up reel 12. The backward direction is from take-up reel 12 to supply reel 10.

The clutch 52 and the brake 54 are under the control of the Capstan Clutch and Brake control circuitry shown here as block 78. This control circuit may, for example, be of the type shown in patent application Serial Number 1,284, filed by Ori Even-Tov. The input signals to the Capstan Clutch and Brake control 78 are provided on lines 80 and 81 in response to a signal at terminal 86 representing a command to start reading or writing on tape 14 with magnetic head 22. Thus, when the read-write signal at terminal 86 is of a first sense that signal will be effective by way of line 80 to cause the clutch control 78 to engage clutch 52. This signal at terminal 86 will also by way of inverter 90, present a signal of a second and opposite sense at the brake control 78 by way of line 81 to cause a release of brake 54. When the clutch 52 is thus engaged and the brake is released, the motor 48 is effective by way of mechanical linkage 50 to rotate the capstan 24 in a direction corresponding to that established by either a forward signal on line 66 or a backward signal on line 68 to the motor reversing control 64.

The tape 14 will then be moved by capstan 24 past head 22 in the desired direction.

When the signal at terminal 86 changes to the second sense it indicates the absence of a command to read or write and is effective by way of the clutch control 78 to disengage clutch 52. This signal from terminal 86 is simultaneously effective through inverter 90 to present a signal of the first sense on line 81 which is effective to cause the brake control 78 to engage brake 54 thus stopping capstan 24.

Signals of the first and second sense mentioned above may be of different polarity or only of different magnitude depending on the requirements of the control circuits. As an example, the signal of a first sense may be a potential of −95 volts while that of a second sense may be 0 volts.

The rotation of the reels 10 and 12 is produced by the motors 32 and 34 respectively, under the control of the motor control circuits 36 and 38, and the reels are braked by the action of the brake 96 shown on the mechanical linkage between motor 32 and the reel 10 and the brake 98 shown on the mechanical linkage between reel 12 and motor 34. The brakes 96 and 98 are operated in response to signals from retriggerable delay flop 100 which is not only effective to actuate the brakes, but is also simultaneously effective to shut off the power to the reel motor controls 36 and 38 at the same time.

The output of the retriggerable delay flop 100 may be a signal which is normally of a first value unless the delay flop has been triggered at which time the output goes to a second value and is maintained at that second value until the end of the period. At that time the output signal returns to the first value unless during the intervening time an input signal which is effective to retrigger the delay flop has been received on one of the input lines. Such delay flops are well known in the art and therefore will not be described in detail here.

The brakes 96 and 98 are so constructed that they are in response to an output signal from retriggerable delay flop 100 of a second value. Simultaneously, by virtue of the connections of delay flop 100 to motor controls 36 and 38, the motor controls also have their power turned on so that the motors 32 and 34 are energized. Upon changing back to the said first value, the output of the delay flop 100 is effective to apply the brakes 96 and 98 to simultaneously shut off the power in the motor controls 36 and 38 to de-energize the motors 32 and 34, respectively.

The input signals to the retriggerable delay flop 100 which are effective to trigger it may be either a signal from line 66 by way of line 106 representing a command for the capstan 24 to move forward during its next period of operation or a signal from line 68 by way of line 108 representing a command for the capstan 24 to move backward during the next period of operation. The signals from lines 66 and 68 may be merely pulses of short duration sufficient to trigger delay-flop 100 which will then be effective to produce an output signal operable to release brakes 96 and 98 and turn on the motor controls 36 and 38 for the period of the delay flop 100. The period the delay flop 100 should be sufficient to allow the reels 10 and 12 to be moved so as to establish the desired loop lengths in the vacuum boxes 18 and 28 in preparation for the operation of the capstan 24 in the direction in which it will be rotated during the next reading or writing operation.

During the reading or writing operation itself the read-write signal from terminal 86 will provide a signal on line 110 which will be effective to maintain delay flop 100 in a triggered state as long as that potential exists on line 110. In this triggered state delay flop 100 provides an output signal which is effective to maintain the brakes 96 and 98 in a released condition while maintaining the power to the motor controls 36 and 38 on so that the reels 10 and 12 may be rotated by motors 32 and 34 in accordance with the signals LR and LM as will be explained subsequently.

The vacuum loop box 18 has a plurality of apertures 112–121 in the back wall thereof. Each of these apertures is connected by way of a tube 125 to individual vacuum operated switches 132–141 as shown in FIGURE 1*b*.

Each of the vacuum switches 132–141 is of the type shown diagrammatically in FIGURE 1*c* which shows in detail vacuum switch 133 consisting of a body portion 131 coupled to a tube 125. This body portion 131 supports diaphragm 140 which is exposed on one side to the pressure in loop box 18 at the aperture to which tube 125 is connected. The diaphragm 142 is exposed on the other side to atmospheric pressure by way of an opening in the portion of body 131 shown to the right hand side in FIGURE 1*c*. Thus, diaphragm 142 will remain in the relaxed position shown in FIGURE 1*c* when the pressure at the aperture to which tube 125 is connected is the same as the atmospheric pressure. The contacts 113*a* and 113*b* will then be open to form an open circuit between leads 152 and 154. When a pressure less than atmospheric is present at the aperture to which tube 125 is connected the diaphragm 142 is deformed to cause contact 113*a* to be made with contact 150 to form a complete circuit between leads 152 and 154.

The vacuum loop box 28 is constructed similarly to vacuum loop box 18 and has a similar plurality of apertures 162–171 which are connected by way of tubes 125 to vacuum switches which are likewise of the type shown in FIGURE 1*c*.

Both the vacuum loop box 18 and loop box 28 in addition to the above mentioned apertures include an aperture 190 which is connected by way of tube 192 to a source of vacuum such as vacuum pump 194 shown in FIGURE 1*b* as being operated by motor 196 to constantly draw on each of the vacuum loop boxes 18 and 28 a vacuum sufficient to maintain the loops 19 and 29 taut within the loop boxes 18 and 28.

As is well known to those familiar with the art to which the present invention is directed, the vacuum loop boxes 18 and 28 desirably contain loops of tape which are sufficient to accommodate the difference between the acceleration and deceleration rates to the capstan 24 as compared with those of the reels 10 and 12. For optimum utilization of the capacity of the loop boxes 18 and 28, one of the tape loops is maintained at its shortest practical length while the other is simultaneously maintained at its longest practical length. These particular lengths are referred to as the upper and lower balance points, respectively. For example, the loop 29, as shown in FIGURE 1*a*, is at its upper balance point while the loop 19 is shown at its lower balance point. These balance points are established as will be explained subsequently at the respective apertures 163 and 120.

With the loops 19 and 29 oriented as shown in FIGURE 1*a* the system is in the proper condition for accommodating a forward rotation of capstan 24 from the stopped condition to a forward transport of the tape, from left to right in FIGURE 1*a*. With the loops so arranged the rapid acceleration of the capstan 24 causes tape loop 29 to lengthen and tape loop 19 to shorten before the high inertia reels 10 and 12 can be moved by motors 32 and 34. With the tape loops established at the balance points shown in FIGURE 1*a* the system is also in the proper condition to accommodate a stopping of a backward rotation of capstan 24, for loop box 28 can accept the tape which will continue to spill from reel 12 and loop box 18 can supply the tape which continues to be taken up by reel 10 until the reels can be stopped.

The opposite balance points must be established for the loops 19 and 29 in preparation for starting a backward rotation of capstan 24 or in preparation for stopping a forward operation of capstan 24. These balance points are established by the positions of apertures 170 and 113. In other words, the loop 19 would be at its upper balance point and have its shortest practical length while the loop 29 would be at its lower balance point and have its longest practical length.

It will be evident from the above description of the optimum loop lengths for the various conditions of operation that it will be necessary to shift the balance points which are effective to control the length of the loops of tape in each of the loop boxes 18 and 28 in response to a signal indicative of the direction in which the capstan 24 is to be rotated before it is started and the balance points will then have to be shifted after rotation begins to anticipate the stopping of capstan 24. To accomplish this control there is provided a balance point control amplifier 200 which receives an input signal on line 202 from a relay 204 whose contact 205 is normally made with the contact 206 connected to line 81. However, when a signal representing a command for backward rotation of the capstan 24 appears on line 68 this signal is effective to set flip-flop 209 which produces a set output on line 210 which in turn energizes the coil 212 of relay 204 to cause the contact 205 to make with contact 214 after disengaging from contact 206. This energized state of relay 204 will be maintained until a signal appears on line 66 representing a command for forward rotation of capstan 24 which signal is effective to reset flip-flop 209 causing the signal previously present on line 210 to disappear and thus releasing relay 204 by allowing coil 212 to be de-energized. Spring 208 then re-establishes contact between the contacts 205 and 206.

The sense of the signal on line 80, which is the signal controlling the balance point control amplifier 200 during the energization of relay 204 is always opposite that on line 81, which is effective to control the balance point control amplifier 200 during de-energization of relay 204. This results from inverter 90. The sense of each of these signals will depend on the presence or absence of the read-write signal at terminal 86. It will thus be evident that the balance points established for the tape loops in the vacuum loop boxes are shifted in dependence upon the presence or the absence of a read-write signal at terminal 86 as well as in dependence upon the energization or de-energization of relay 204. Thus, the loop lengths shown in FIGURE 1*a* are established when a read-write signal appears at terminal 86 and relay 204 is energized. The same balance points will be established when the read-write signal is not present at terminal 86 if relay 204 is de-energized. Likewise, an opposite orientation of the loops in the loop boxes 18 and 28 is established when the read-write signal is present at terminal 86 and relay 204 is de-energized or under the condition in which the read-write signal is not present at terminal 86 and relay 204 is energized.

Figure 2:
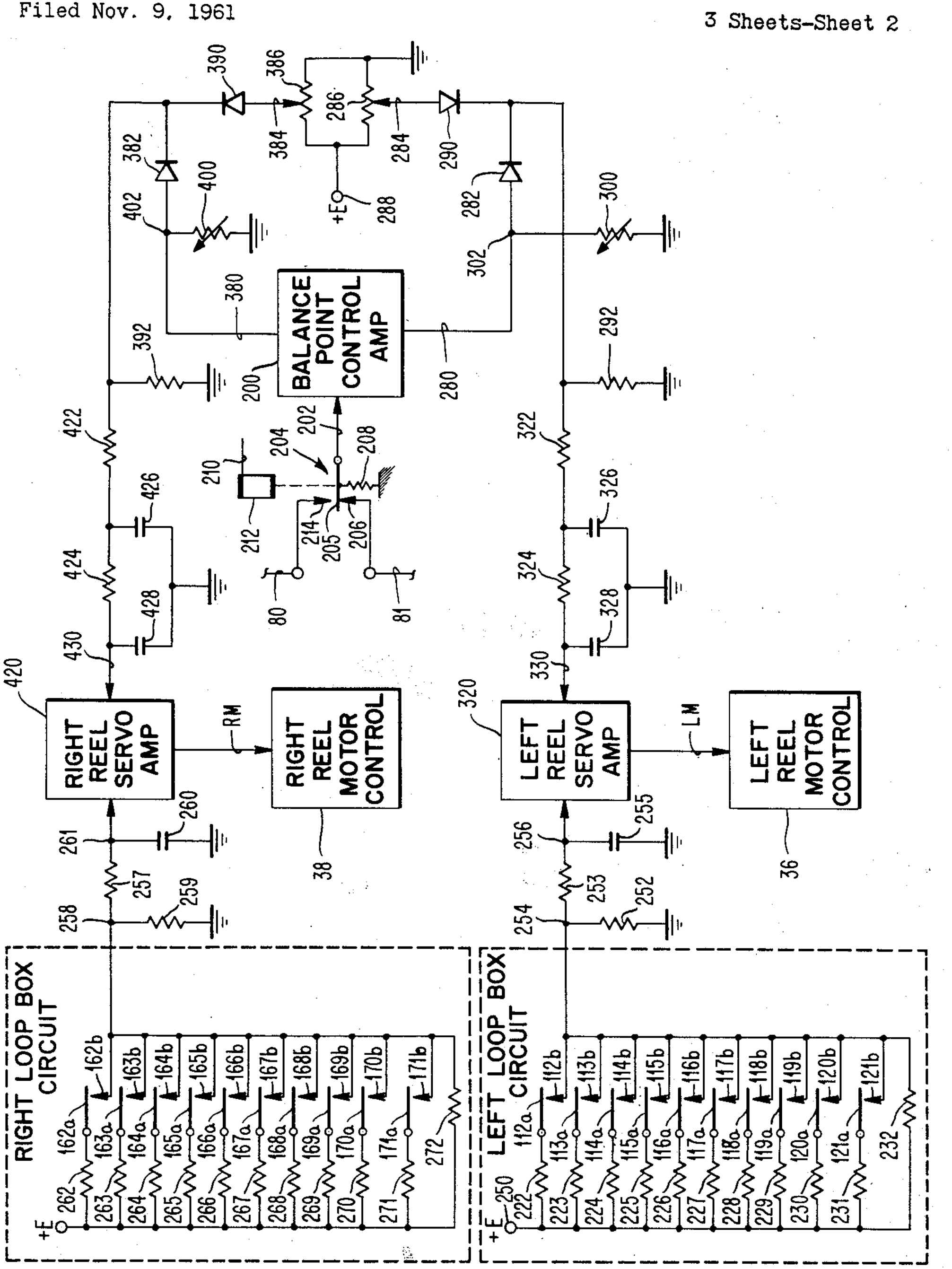
FIGURE 2 is a schematic diagram of the control circuit of this invention.

Referring now to FIGURE 2, it will be seen that resistors 222–232 are effective by virtue of the parallel connections between these resistors as selectively established by the vacuum switch contacts 112*a*–121*a* and the corresponding contacts 112*b*–121*b* to establish in combination with resistor 252 a voltage divider between the potential source +E at terminal 250 and ground potential on one side of resistor 252. This potential divider will thus produce across resistor 252 a potential having a magnitude which is a direct function of the length of the tape loop 19 in vacuum loop box 18, for the effective resistance established by the parallel connection of resistors 222–232, as selectively established by contacts of the vacuum switches, increases as the tape loop 19 increases in length. In the left loop box, for example, only those switches 132–141 which are below the tape loop 19 will have their associated contacts made since the vacuum necessary to make the switches exists only below the tape loops.

There is similarly established across resistor 259 a potential which is a direct function of the length of the tape loop 29 in vacuum loop box 28 in response to the selective actuation of the switch elements 162*a*–171*a* and 162*b*–171*b* to determine the effective resistance of the parallel combination of resistors 262–272.

The potential across resistor 252 representing the actual tape loop length in loop box 18 would provide at terminal 254 a stepwise voltage change as the loop changed its length. In order to avoid a saturation of the control circuits for the left reel motor it is desirable to produce from the potential across resistor 252 a potential having a limited maximum rate at which the voltage changes. This is particularly necessary since a rate control is utilized as will subsequently be described.

The series combination of resistor 253 and capacitor 255 which are joined at terminal 256 and coupled across resistor 252, provides this potential at terminal 257.

In similar fashion resistor 257 and capacitor 260 which are joined at terminal 261 and connected in parallel to resistor 259, provide a potential at terminal 261 which is limited in its rate of change.

The potential at terminal 256 is thus representative of the length of tape loop 19 and the potential at terminal 261 is representative of the length of tape loop 29. These potentials providing one of the input signals to the reel motor controls 36 and 38 must represent the balance points desired for the loops. These other inputs are provided as described below.

The balance point control amplifier 200 is designed to produce a current in line 280 which in flowing through the preadjusted variable resistor 300 produces a potential at terminal 302 which may be either of a low value or of a high value in dependence upon the signal on line 202. The potential at terminal 302 will desirably be at its high value to represent the upper balance point for left hand loop box 18 when the signal on line 202 is of the first sense, whereas it will be at its lower potential to represent the lower when the signal on line 202 is of the second sense.

The current flow from terminal 288, which is connected to a source of potential +E, through resistor 286 to ground is tapped off at adjustable tap 284 to establish a potential representing the lower balance point for the left hand loop box 18. This latter potential is higher than the potential at terminal 302 when the potential at terminal 302 is at its low value and is lower than the potential at terminal 302 when it is at its high value. It will be evident that under the first of these conditions diode 290 will be conductive whereas diode 282 will be back-biased. Under the second condition diode 282 will be conductive and diode 290 will be back-biased. There is thus produced across resistor 292 a potential which is selectively equal to that potential representing either the upper balance point or the lower balance point in dependence upon the output of balance point control amplifier 200.

The sense of the signal on line 202 and therefore the output on line 280 from the balance point control amplifier are subject to instantaneous change either as a result of the energization of relay 204 or as a result of the presence or disappearance of the read-write signal at terminal 86. It is desirable in the interest of a smooth control of the loops from one balance point to another to change the potential representing the desired loop length in a substantially linear fashion between the potentials representing the two balance points. To accomplish such a smooth variation an integrating circuit comprising resistors 322 and 324 along with capacitors 326 and 328 is utilized to provide an input on line 330 to the left reel servo amplifier 320 of potential related to the integral of the potential across resistor 292.

As will be evident from FIGURE 2, the left reel servo amplifier 320 responds to a deviation from a predetermined relationship between the input from line 330 representing the desired loop length and the input from terminal 256 representing the actual loop length and provides a control signal along output line LM to the left reel motor power control 36 corresponding to this deviation. This control signal LM effects, through the motor control 36, an operation of the left reel motor 10 in a direction and at a speed sufficient to maintain the deviation between the potential on line 330 and that at terminal 256 representing balance.

The predetermined relationship referred to above may be one of equality or other relationships as may be established when the control loop length is equal to the desired loop length.

Balance point control amplifier 200 produces in line 380 a current which will establish across variable resistor 400 a potential which is of opposite sense to that established across resistor 300. In other words, when terminal 302 is a low potential terminal 304 will be at a high potential and vice versa.

The potential established by tap 384 of resistor 386 represents the lower balance point of right hand loop box 28 and the diodes 382 and 390 function in a similar fashion to that previously described for diodes 290 and 282. There is, therefore, produced across resistor 392 a potential representing the desired balance point for the right hand loop box 328. This potential is modified by the integrating circuit composed of resistors 422 and 424 in combination with capacitors 426 and 428 to establish at input line 430 of the right reel servo amplifier 420 a potential representing the desired loop length for loop 29. The right reel servo amplifier 420 is similar to left reel servo amplifier 320 and produces output signals RM which operates the motor power control 38 similarly to the operation of motor power control 36 by output signal LM.

The potentials representing the upper and lower balance points should preferably be so selected that the tape will tend to stay opposite apertures 113 and 163 for the upper balance points and opposite apertures 120 and 170 for the lower balance points.

As will be evident from FIGURE 1*a*, the apertures 112–121 and 162–171 need not be regularly spaced since close control is only necessary in the region of the upper and lower balance points. The resistors 222–231 and 262–271 may be graded to provide a change in potential across resistors 252 and 259 which are roughly a linear function of the tape length changes if the spacings are not the same.

Figure 3:
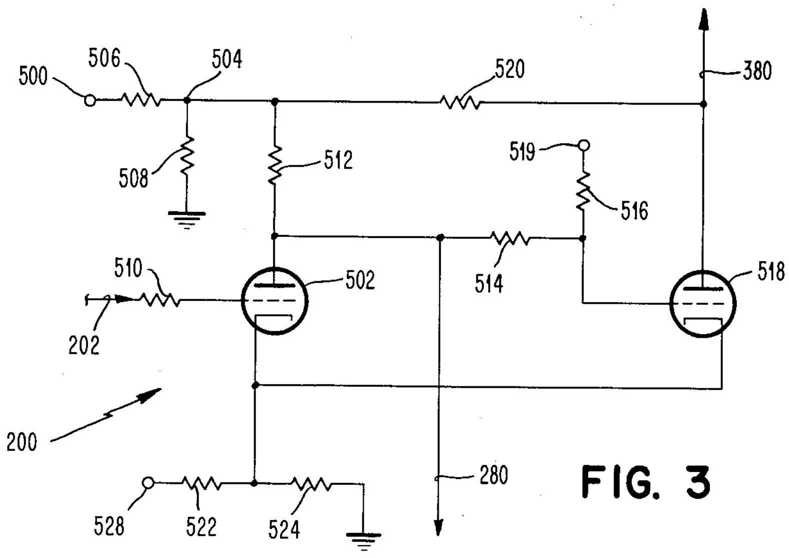
FIGURE 3 is a schematic diagram of a circuit which may be used as the Balance Point Control Amplifier.

The balance control amplifier shown in FIGURE 3 may be substituted for the amplifier shown as block 200 in FIGURES 1*a* and 2. A D.C. supply, which is provided at terminal 500, establishes the plate supply to tube 502 at terminal 504 by virtue of the voltage divider comprising resistors 506 and 508. When the signal on line 202 is in a first sense, as for example at −95 volts, the grid potential established through grid resistor 510 will cause tube 502 to be nonconductive whereas the tube will be conductive when the signal on line 202 is in a second sense, as for example at 0 volts.

When tube 502 is cut off the current flow through plate resistor 512 is reduced to establish on line 280 a high potential. This high potential at the plate causes current flow through the voltage divider comprised of resistors 514 and 516 to a source of negative potential at terminal 519 to produce a potential on the grid of tube 518 of sufficiently high potential to cause tube 518 to be conductive.

When tube 518 is conductive, the current flow through the plate resistor 520 increases as compared with that flowing during the nonconductive state of tube 518, and the potential on line 380 is reduced to a low value. As a result, the upper balance point will be effective for loop box 18 and the lower balance point will be effective for loop box 28.

Cathode bias for both tubes 502 and 518 is supplied by the potential established at the junction of resistors 522 and 524 due to the current flowing from ground to a source of negative D.C. potential connected to terminal 528.

It will be evident that the amplifier of FIGURE 3 is a two stage amplifier which provides at lines 280 and 380 signals having either a low or high value in dependence upon the signal input at line 202. The signals on lines 280 and 380 are always maintained of opposite sense, that is when one is high the other is low.

Figure 4:
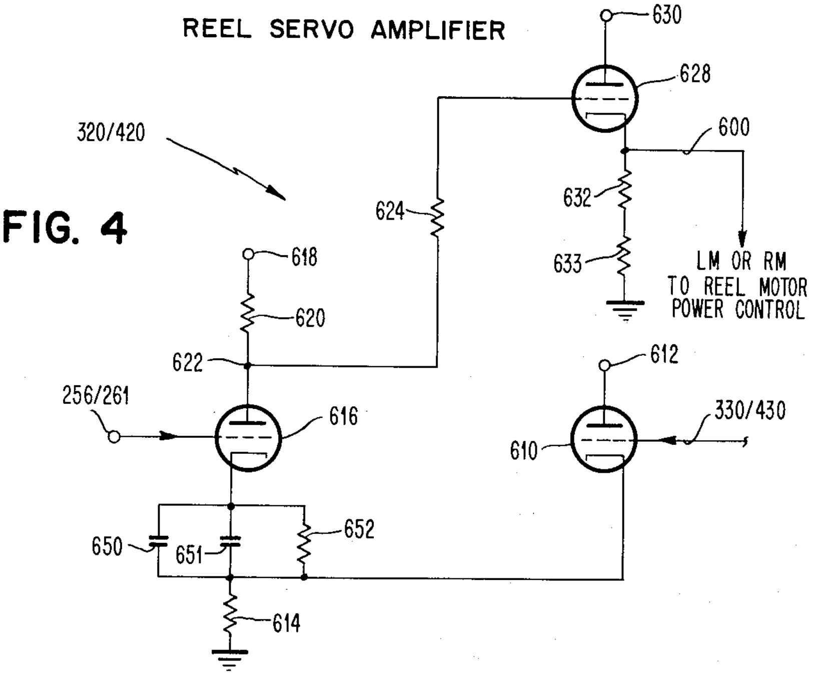
FIGURE 4 is a schematic diagram of a circuit which may be used as a Reel Servo Amplifier.

FIGURE 4 shows a reel servo amplifier which may be substituted for both the left reel servo amplifier 320 and the right reel servo amplifier 420 shown in block form in FIGURE 2. The circuit essentially serves to provide at the output line 600, which may be either the LM line of the left reel servo amplifier or the line RM of the right reel servo amplifier, a potential which varies in accordance with the deviation of the desired loop length from the actual loop length, in other words the deviation of the signal on line 330 and at terminal 256 from the balanced condition.

It will be evident that a change in potential at line 330, for example, causes a change in the grid potential of tube 610 which will in turn cause a change in current flow through the tube from the D.C. source connected at terminal 612. This change in current flow will flow also, by virtue of cathode resistors 614, cause a change in potential at the cathode of tube 616. The result of the change in potential of the cathode in tube 616 is to change the current flow through tube 616 from the D.C. source connected to terminal 618 in a sense opposite that in tube 610. The changing current through plate resistor 620 causes a change in the potential at terminal 622 which by way of the grid resistor 624, similarly changes the potential on the grid of tube 628. As a consequence, there will then be a change in the current flow through tube 628 from the positive D.C. source connected to terminal 630. This changing current is reflected at the output line 600 which is across both cathode resistor 632 and 633. It will thus be evident that the potential at output line 600 will change in accordance with the deviation from the balance condition of the potentials on line 330 or 430 and at terminal 256 or 261. The output line 600 provides a control signal to the reel motor control such as reel motor controls 36 and 38 which causes the reel motors to rotate the reels in a direction which will cause the potential at terminal 256 to change so as to substantially follow the changes in potential on line 330.

This control is enhanced by the use of a rate control which is established by the parallel combination of capacitors 650 and 651 and resistor 652 in the cathode circuit of tube 616. Since this rate circuit is not included in the cathode circuit of tube 610 but is included in the cathode circuit of tube 616 the variation of output at line 600 will occur not only in accordance with the deviation of the potentials on line 330 and at terminal 256, but also in accordance with the rate of change of the potential at terminal 256. This rate control provides a modified control signal which is of greater magnitude during the initial period of the changes in potential occurring at terminal 256. This modified control signal on line 600 is thus effective to cause the connected reel motor to accelerate or decelerate more rapidly than would otherwise be the case after a sudden change in potential at terminal 256, as might occur as the tape passes one of the apertures.

What is claimed is:

1. In a tape transport, a motor, a capstan driven by said motor, a second motor, a storage reel for the transport of tape driven by said second motor, a vacuum loop box for the storage of a loop of tape between said capstan and said reel, a reel motor control comprising a plurality of vacuum switches for detecting the length of said loop, each of said switches being coupled to said loop box so that it responds to the pressure at a different interior point along the length of the loop box, signal producing means operable in response to the selective actuation of said switches by the vacuum below said loop to produce a signal proportional to the length of the tape loop in said loop box, control means operable in response to the deviation of said signal from a predetermined relationship with a signal representing a desired loop length to energize said second motor driving said reel in direction and amount depending on the polarity and magnitude of said deviation to change said loop length toward said desired value.

2. In a tape transport, a motor, a capstan driven by said motor, a second motor, a storage reel driven by said second motor for the transport of tape, a vacuum loop box for the storage of a loop of tape between said capstan and said reel, a reel motor control comprising a plurality of vacuum switches for detecting the length of said loop, each of said switches being coupled to said loop box so that it responds to the pressure at a different one of spaced interior points along the length of the loop box, signal producing means operable in response to the selective actuation of said switches by the vacuum below said loop to produce a signal which is proportional to the length of the tape loop in said loop box, control means operable in response to the deviation of said signal from a predetermined balanced relationship with a signal representing an optimum loop length for accommodation of an anticipated speed change of said capstan to energize said second motor driving said reel in direction and amount tending to maintain said optimum loop length.

3. In a tape transport, a motor, a capstan driven by said motor, a second motor, a storage reel driven by said second motor for the transport of tape, a vacuum loop box for the storage of a loop of tape betwene said capstan and said reel, a reel motor control comprising a plurality of vacuum switches for detecting the length of said loop, each of said switches being coupled to said loop box so that it responds to the pressure at a different one of spaced interior points along the length of the loop box, signal producing means operable in response to the selective actuation of said switches by the vacuum below said loop to produce a first signal which is proportional to the length of the tape loop in said loop box, means for modifying said first signal in accordance with its rate of change, control means operable in response to the deviation of said modified first signal from a predetermined balanced relationship with a signal representing an optimum loop length for accommodation of an anticipated speed change of said capstan to energize said second motor driving said reel in direction and amount tending to maintain said optimum loop length.

4. In a tape transport mechanism, a motor, a capstan driven by said motor for moving tape, a supply reel and a take-up reel, a vacuum loop box for the storage of buffer loops of tape between each of said reels and said capstan, a motor for driving each of said reels, a reel motor control for each of said reels comprising a plurality of vacuum switches each associated with a different point along the length of one of said loop boxes so that it responds to the pressure at said point, a plurality of resistors associated with each of said loop boxes each selectively coupled by a corresponding one of said switches between two circuit points thereby to form a parallel network of impedances having a resistance directly related to the length of the tape loop in the corresponding loop box, a voltage divider circuit including said resistance network to establish for each of said loop boxes a potential indicative of the length of the loop of tape in the corresponding loop box, means for establishing separate potential indicative of the desired length of loop for each of said boxes and means responsive to the difference in potential indicative of the actual loop length and the desired loop length for energizing said motor driving the corresponding reel in direction and magnitude corresponding with the sense and magnitude of the deviation of said potentials to thereby change the length of tape in the corresponding loop box toward said desired length.

5. In a tape transport, a motor, a capstan driven by said motor for transporting tape past a magnetic head, having a supply reel and a take-up reel with separate vacuum loop boxes for holding buffer loops of tape between said capstant and each of said reels, a motor for driving each of said reels, a reel motor control system comprising a plurality of vacuum operated switches associated with each of said loop boxes, means for establishing connection between each of said vacuum switches and a different point along the length of its corresponding loop box so that the vacuum established in the box under the loop of the tape contained therein is effective to make the switches associated with the points along the length of said boxes under said loops, a resistor associated with each of said vacuum switches and in circuit therewith to establish for each of said boxes a parallel network of those of said resistors associated with those of said vacuum switches which are made, circuit means including said parallel networks to establish for each of said loop boxes a potential indicative of the length of the tape loop therein, means for establishing for each of said loop boxes a first potential representative of an upper balance point and a second potential representative of a lower balance point for the tape loop of each of said boxes, a potential integrating means for each of said reel drive motors, means for selectively coupling one of said first and said second potentials to one of said integrating means for producing an integrated potential for one of said motors driving said reels and simultaneously connecting to the other of said first and said second potentials to the other of said integrating means for producing an integrated potential for the other of said motors driving said reels, a control circuit for each of said motors driving said reels operative in response to the deviation of the potential representative of the length of the tape loop in each of the corresponding loop boxes from a predetermined relationship to the integrated potentials selectively established for each of said loop boxes for energizing said motor driving the corresponding reel in direction and at a speed corresponding to the sense of said deviation and its magnitude, and means for modifying the effect of said deviation on said control circuits in accordance with the rate of change of the length of said loop whereby said motors driving said reels are controlled to tend to establish the length of each of said loops at the selected balance points.

6. In a tape transport, a motor, a capstan driven by said motor for transporting tape past a magnetic head, a supply reel and a take-up reel, a motor for driving each of said reels, separate vacuum loop boxes for holding buffer loops of tape between said capstan and each of said reels, a reel motor control system comprising a plurality of vacuum operated switches associated with each of said loop boxes, means for establishing connection between each of said vacuum switches and a different point along the length of its corresponding loop box so that the vacuum established in the box under the loop of tape contained therein is effective to operate the switches associated with the points along the length of said boxes under said loops, potential producing means responsive to the operation of said switches to produce a potential indicative of the length of the tape loop in each of said boxes, means for establishing for each of said loop boxes a first potential representative of an upper balance point and a second potential represenative of a lower balance point for the tape loop of each of said boxes, a potential integrating means for each of said reel drive motors, means for selectively coupling one of said first and said second potentials to one of said integrating means for producing an integrated potential for one of said reel drive motors and simultaneously connecting to the other of said first and said second potentials to the other of said integrating means for producing an integrated potential for the other of said reel drive motors, a control circuit for each of said motors driving said reels operative in response to the deviation of the potential representative of length of the tape loop in each of said loop boxes from a predetermined relationship to the integrated potentials selectively established for each of said loop boxes for energizing said motor driving the corresponding reel in direction and at a speed corresponding to the sense of said deviation and its magnitude, and means for modifying the effect of said deviation on said control circuits in accordance with the rate of change of the length of said loop whereby said motors driving said reels are controlled to tend to establish the length of each of said loops at the selected balance points for each of said loop boxes.

References Cited in the file of this patent

UNITED STATES PATENTS

| | | |
|---|---|---|
| 2,921,753 | Lahti et al. | Jan. 19, 1960 |
| 2,952,010 | Demer et al. | Sept. 6, 1960 |
| 2,990,127 | Cannings et al. | June 27, 1961 |